W. S. ADAMS.
TRUCK BRAKE.
APPLICATION FILED OCT. 21, 1908.
946,931.
Patented Jan. 18, 1910.
3 SHEETS—SHEET 1.
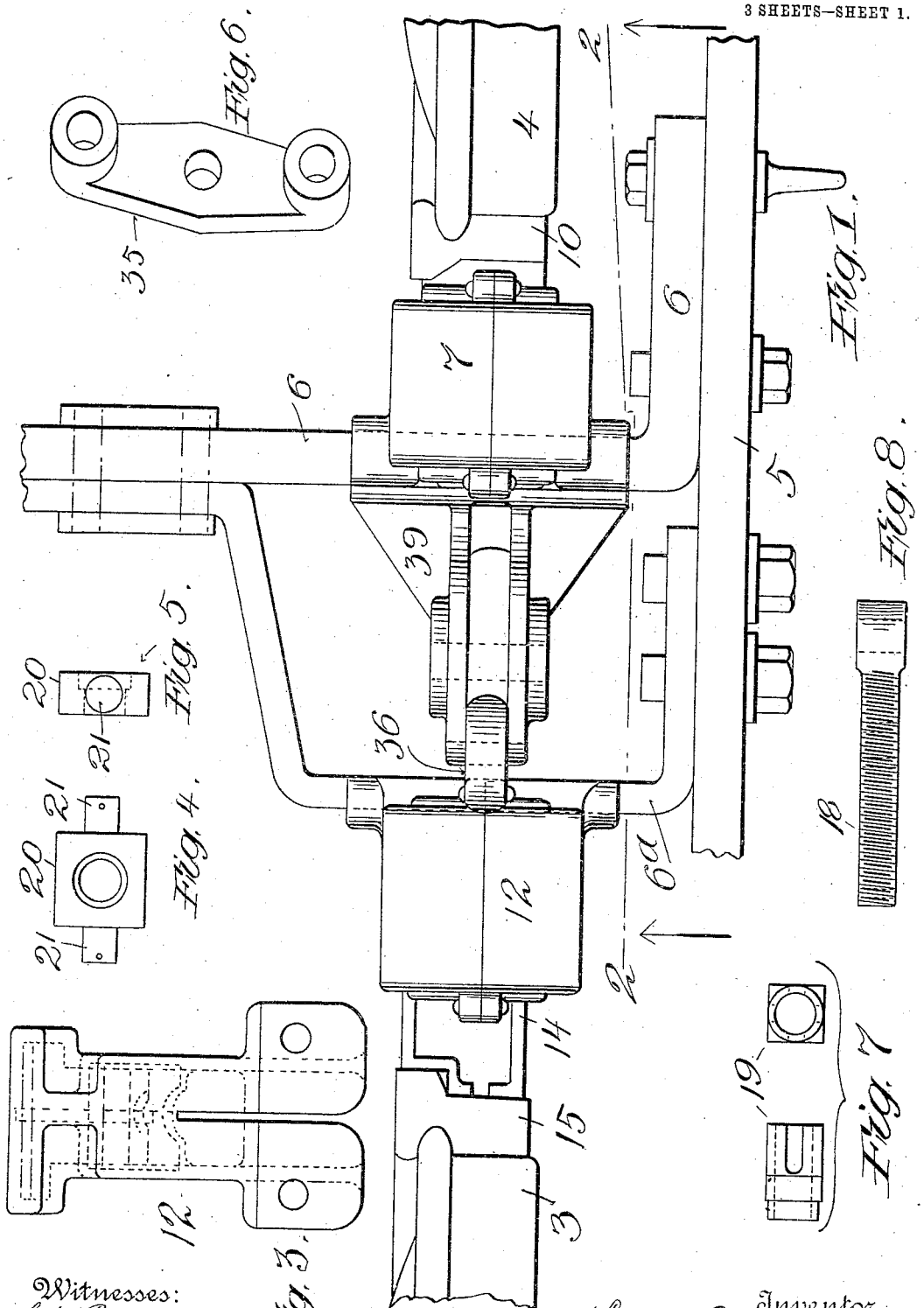
Witnesses:
C. W. Benjamin
Gustave Dumont
Inventor
Walter S. Adams.
By his Attorney
Joseph L. Levy

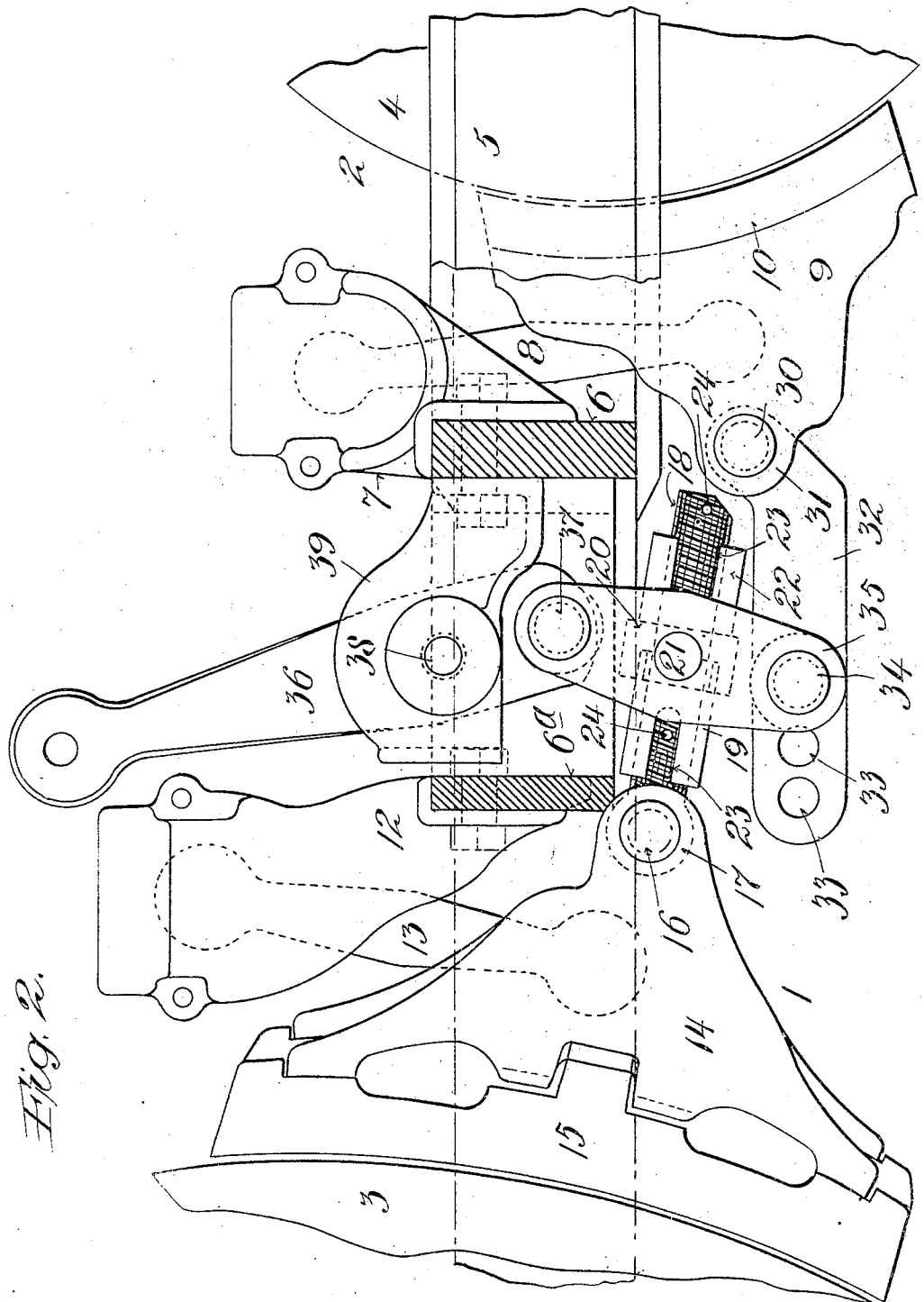

W. S. ADAMS.
TRUCK BRAKE.
APPLICATION FILED OCT. 21, 1908.

946,931.

Patented Jan. 18, 1910.
3 SHEETS—SHEET 3.

Witnesses:

Inventor
Walter S. Adams
By his Attorney

UNITED STATES PATENT OFFICE.

WALTER S. ADAMS, OF PHILADELPHIA, PENNSYLVANIA, ASSIGNOR TO THE J. G. BRILL COMPANY, OF PHILADELPHIA, PENNSYLVANIA.

TRUCK-BRAKE.

946,931.   Specification of Letters Patent.   Patented Jan. 18, 1910.

Application filed October 21, 1908. Serial No. 458,790.

*To all whom it may concern:*

Be it known that I, WALTER S. ADAMS, a citizen of the United States, and a resident of the city and county of Philadelphia and State of Pennsylvania, have invented a new and useful Improvement in Truck-Brakes, of which the following is a specification.

The object of my invention is to provide a brake suitable for maximum traction trucks, whereby greater pressure is applied to one pair of wheels than the other. This object is accomplished by my invention, one embodiment of which is hereinafter set forth.

Figure 9:
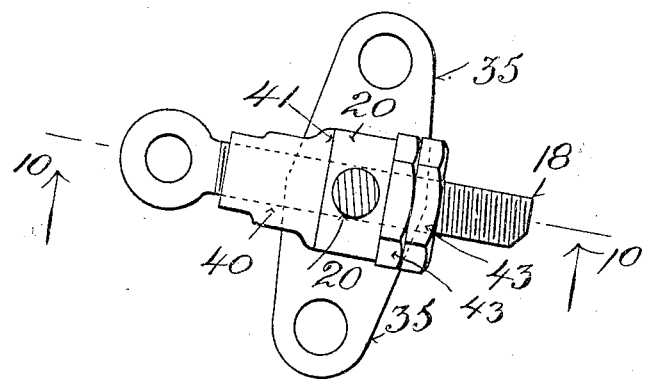
Figure 10:
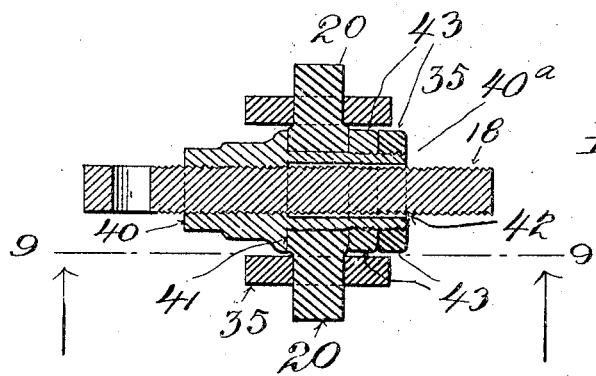

For a more particular description of my invention, reference is to be had to the accompanying drawings, forming a part hereof, in which:

Figure 1 is a plan view of a portion of a truck provided with my improved brake. Fig. 2 is a sectional view taken on the line 2—2 of Fig. 1, looking in the direction of the arrows. Fig. 3 is an elevation of a hanger support. Figs. 4, 5, 6, 7 and 8 show details of the brake mechanism. Figs. 9 and 10 show a modified structure.

Throughout the various views of the drawings, similar reference characters designate similar parts.

My improved brake 1 is applied to a suitable truck 2 which is provided with the usual driving wheels 3 and trailing wheels 4 which are mounted in the conventional manner and this truck is also provided with side frames 5 united by suitable crossings 6 and 6ª. The crossing 6 has secured thereon a bracket 7, from which depends a hanger which supports a brake shoe holder 9 which carries a brake shoe 10 adapted to be pressed against a trailing wheel 4 by means which will be described below. The hanger 8 is preferably made with balls at each end and the bracket 7 and brake shoe holder 9 have suitable sockets to receive said balls and this structure permits the brake shoe 10 to have a limited movement in any direction.

The crossings 6 and 6ª carry a bracket 12 in the upper end of which is mounted a hanger 13 which carries at its lower end a brake shoe holder 14 in which the brake shoe 15 is mounted, which brake shoe 15 is adapted to rub against the driving wheel 3. The hanger 13 is similar to the hanger 8 and carries the brake shoe holder 14 in precisely the same manner so that the brake shoe 15 has a universal movement.

The brake shoe holder 14 has pivots 16 mounted in ears 17 and between these ears 17 is mounted an eye-bolt 18 which turns on the pivot 16. The eye-bolt 18 has a nut 19 thereon which abuts against a block 20 with trunnions 21 and this block 20 also has a second nut 22 against which it abuts. The nuts 19 and 22 have slots 23 to prevent turning when collars are placed in the perforations 24 of the bolt 18. The trunnions 21 enter perforations 25 in the links 35. The brake shoe holder 9 is also provided with a pivot 30 mounted in ears 31 and between these ears 31 is a link 32 provided with a number of perforations 33 through one of which extends a pin 34 on which a pair of parallel links 35 are mounted. These links pass on each side of the rod or eye-bolt 18 and are connected therewith by means of the trunnions 21 as described above, and at the upper end of these links 35 is an upright lever 36 pivoted thereto by means of a pivot 37. This lever is fulcrumed at 38 by means of a pin that passes through a bracket 39 which is on each side of the lever 36 and is secured to the crossing 6.

In Figs. 9 and 10 are shown a slight modification as to certain details. The block 20 fits on a nut 40 with a shoulder 41 and screw threads 42 on which are nuts 43 which fix the block 20 in place.

Upon reference to Figs. 9 and 10, it will be noted that the nut 40 has a sleeve 40ª which runs through the trunnion block 20. The two jam nuts 43 on the end of this sleeve serve, when forced against the trunnion block, to keep the said nut 40 from turning. The object of this is to provide an extended movement to the rod 18 so that the latter can be moved in the direction of the eye until the end of the rod comes within the sleeve and the jam nuts 43 will still perform their function, even after the end of said rod is adjusted to bring it within said sleeve.

From the foregoing the operation of my improved brake will be readily understood. When the lever 36 is thrown, the links 35 shift correspondingly and through them pressure is exerted on the brake shoes 10 and 15, as is obvious. This pressure will be exerted in proportion to the size of the respective wheels.

While I have shown and described one embodiment of my invention, it is obvious that it is not restricted thereto, but is broad enough to cover all structures that come within the scope of the annexed claims.

What I claim is:

1. In a brake mechanism, the combination with the brake shoe holders, means for pivotally suspending the same and parallel links, of a screw-threaded rod, a nut having threaded engagement therewith and having a sleeve portion and jam nuts on said sleeve portion.

2. In a brake mechanism, a screw-threaded rod, a nut having threaded engagement therewith and having a sleeve portion and jam nuts on said sleeve portion, combined with pivotally suspended brake shoe holders, parallel links, a trunnion block supported in said links and having an opening through which said sleeve is received.

3. In a brake mechanism, an upright lever, a fulcrum for the same, links pivoted to said lever, a trunnion block having trunnions mounted in said links, a nut having a sleeve passed through said trunnion block, a rod having screw-threaded engagement with said nut and passed loosely through the sleeve, and jam nuts on said sleeve adapted to be forced against said trunnion block.

Signed at Philadelphia, Pennsylvania, this 17 day of October, 1908.

WALTER S. ADAMS.

Witnesses:
HENRY C. ESLING,
HARRY F. MCKILLIP.